(12) United States Patent
Sorvari et al.

(10) Patent No.: US 7,505,753 B2
(45) Date of Patent: Mar. 17, 2009

(54) DISTRIBUTION OF TASKS OVER TIME IN A MOBILE TERMINAL

(75) Inventors: Antti Sorvari, Itäsalmi (FI); Markus Kähäri, Helsinki (FI)

(73) Assignee: Nokia Corporation, Espoo (FI)

( * ) Notice: Subject to any disclaimer, the term of this patent is extended or adjusted under 35 U.S.C. 154(b) by 47 days.

(21) Appl. No.: 10/509,008

(22) PCT Filed: Mar. 24, 2003

(86) PCT No.: PCT/FI03/00222

§ 371 (c)(1),
(2), (4) Date: Jun. 2, 2005

(87) PCT Pub. No.: WO03/081882

PCT Pub. Date: Oct. 2, 2003

(65) Prior Publication Data

US 2005/0245245 A1 Nov. 3, 2005

(30) Foreign Application Priority Data

Mar. 25, 2002 (FI) .................................. 20020570

(51) Int. Cl.
*H04B 1/16* (2006.01)
*H04B 1/38* (2006.01)
(52) U.S. Cl. .................... 455/343.4; 455/574
(58) Field of Classification Search ............ 455/343.4, 455/574, 343.1, 343.2, 343.3, 343.5, 418, 455/573, 127.1; 379/221.11
See application file for complete search history.

(56) References Cited

U.S. PATENT DOCUMENTS 5,511,240 A * 4/1996 Nishiyama ............... 455/127.1
5,689,825 A * 11/1997 Averbuch et al. ............ 455/418
5,896,566 A     4/1999 Averbuch et al. ............ 455/419
6,229,990 B1    5/2001 Toshida ....................... 455/69
6,344,727 B1 *  2/2002 Desai et al. ................. 320/107
6,505,055 B1 *  1/2003 Kahn et al. ................. 455/564

(Continued)

FOREIGN PATENT DOCUMENTS

EP    1032 230 A2    8/2000

(Continued)

OTHER PUBLICATIONS

Japanese Office Action (Notice of Rejection) issued Jul. 24, 2007 in corresponding Japanese Patent Application No. 2003-579450 (English translation).

(Continued)

*Primary Examiner*—Nick Corsaro
*Assistant Examiner*—Shannon R Brooks (57) ABSTRACT

The invention relates to a method, a device and a process for distributing various tasks performed by a mobile terminal (101) over time. The idea of the invention is to increase talk and standby times of said terminal (101) by executing as many power consuming, delayable tasks as possible when the terminal is connected to a charging device (102). Advanced solution exploits e.g. ideal task execution time intervals, the calculation of which is based on gathered user profile information. An intelligent charging device (102) with memory and processing means to share the task execution with said terminal (101) or to completely take care of some tasks on behalf of said terminal (101) is presented.

32 Claims, 4 Drawing Sheets

U.S. PATENT DOCUMENTS

| | | | |
|---|---|---|---|
| 6,792,297 B2 * | 9/2004 | Cannon et al. | 455/573 |
| 2001/0055978 A1 * | 12/2001 | Herrod et al. | 455/517 |
| 2002/0040326 A1 * | 4/2002 | Spratt | 705/26 |

FOREIGN PATENT DOCUMENTS

| | | |
|---|---|---|
| JP | 69684/1996 | 3/1996 |
| JP | 205396/1997 | 8/1997 |
| JP | 304578/1998 | 11/1998 |
| JP | 11-068994 | 3/1999 |
| JP | 2000-82007 | 3/2000 |
| JP | 2000-253010 | 9/2000 |
| JP | 2001-78258 | 3/2001 |
| JP | 2001-326721 | 11/2001 |

OTHER PUBLICATIONS

Patent Abstracts of Japan, Publication No. 08-69684, published Mar. 12, 1996.
Patent Abstracts of Japan, Publication No. 2000-082007, published Mar. 21, 2000.
Patent Abstracts of Japan, Publication No. 10-304578, published Nov. 13, 1998.
Patent Abstracts of Japan, Publication No. 2001-326721, published Nov. 22, 2001.
Patent Abstracts of Japan, Publication No. 09-205396, published Aug. 5, 1997.
Patent Abstracts of Japan, Publication No. 2000-253010, published Sep. 14, 2000.
Patent Abstracts of Japan, Publication No. 2001-078258, published Mar. 23, 2001.

* cited by examiner

DISTRIBUTION OF TASKS OVER TIME IN A MOBILE TERMINAL

CROSS-REFERENCE TO RELATED APPLICATIONS

This application is the U.S. National Stage of International Application PCT/FI03/00222 filed Mar. 23, 2003, published in the English language on Oct. 2, 2003 with international Search Report under International Publication Number WO 03/081882 A1 and claiming priority from Finnish Patent Application No. 20020570 filed Mar. 25, 2002.

BACKGROUND OF THE INVENTION

1. Technical Field

The invention relates to a method, a device and a process for distributing various tasks performed by a mobile terminal over time.

2. Discussion of Related Art

One current concern is the power consumption of the mobile terminals, which with new features related to mobile Internet and third technology require more power. Other issues to consider are the network capacity, cost and QoS (Quality of Service) demands which vary depending on time and the nature of the required service.

There are a few known solutions relating to the flexible downloading of data or retreaving and sending e.g. electronic mail by a mobile terminal. U.S. Pat. Nos. 5,896,566 and 5,689,825 disclose the use of a battery charger module with built-in connection to a PLMN (Public Land Mobile Network) network. The availability of a software update is detected by the mobile terminal, and the update is downloaded via the charger using the quality and speed of a fixed line network, when the terminal is placed in the charger. However, this solution is due to the rather costly and complicated dual connection viable only where the bandwidth over the air interface available is narrow, making the transfer of large data files slow, and when the signal quality is low resulting in high error rates.

The Nokia 9110i (trademarks of Nokia Corporation) handset, which is a handset with email and other data communication facilities, has built-in feature for timed fetching of mails or information from the Internet, like webpages. However, no powersaving or cost-saving considerations are made.

In the third generation mobile terminals including UMTS (Universal Mobile Telecommunication System) terminals, there is functionality and capacity for sufficiently error-free and quick downloading of data files over the air interface, making the mobile terminals to this respect essentially comparable with devices connected to PLMN networks. At the same time the usage will require longer and longer talk and standby times. By developing better batteries and more efficient power management the terminal's power performance can be stretched further. However, as can be envisaged by the advent of mobile Internet browsing, frequent downloads of music or video files require that all solutions that can decrease the power consumption of these mobile terminals should be investigated.

DISCLOSURE OF THE INVENTION

In order to overcome the problems mentioned above, the present invention discloses a method, a device and a process for distributing various tasks performed by a mobile terminal over time, with the idea to minimize the need for battery power of mobile terminals in performing certain tasks and functions. A basic assumption in this context is, that as the complexity of the mobile terminals increases it is apparent that there will be several power consuming operations wherein the exact time of execution is not very critical. It is also possible to identify the tasks which are, for some reason or another, to be performed by advanced mobile terminals more favorably at some time later on instead of instantly.

According to the invention, a method for determining the time of execution for tasks to be performed by a mobile wireless communications terminal, wherein said execution is postponed to a later point of time, is characterized in that said method comprises the steps of receiving in the mobile terminal instructions to perform one or more tasks that can be executed with a delay, storing said instructions in a queue, checking in said terminal whether said terminal is coupled to a charging device, executing said tasks upon recognising an electrical connection between said mobile terminal and said charging device.

In another aspect of the invention, a method for determining the time of execution for tasks to be performed by a mobile wireless communications terminal, where said execution is postponed to a later point of time, is characterized in that said method comprises the steps of studying under a period of time the battery charging routines of the user, calculating time intervals with a high likelihood that said mobile terminal is being connected to the charger, receiving in the mobile terminal instructions to perform one or more tasks that can be executed with a delay, storing the instructions in a queue, executing said tasks upon entering one of said calculated time intervals.

In a further aspect of the invention, a method for determining the time of execution for tasks to be performed by a mobile wireless communications terminal, where said execution is postponed to a later point of time, is characterized in that said method comprises the steps of studying under a period of time the battery charging routines of the user, calculating time intervals with a high likelihood said mobile terminal being connected to the charger, receiving in the mobile terminal instructions to perform one or more tasks that can be executed with a delay, storing the instructions in a queue to be executed during said time interval, checking in the mobile terminal whether said mobile terminal is coupled to a charging device upon entering said time interval, executing said tasks if that is the case;

deferring the execution of said tasks in said time interval, if the mobile terminal is not coupled to a charging device, until one of the following conditions applies, whichever occurs first:

the mobile terminal is connected to a charging device;

the maximum time limit for postponing the execution of said tasks is approaching;

the level of battery power available is approaching a limit putting execution of at least part of said postponed tasks at risk.

In a further aspect of the invention, a mobile wireless communications terminal capable of wireless speech and data communication over an air interface, said terminal including processing means for processing tasks and timing means for performing timed execution of said tasks, said terminal including memory means for storing instructions and data associated with each such task, is characterized in that said terminal is arranged to store received instructions for delayable tasks in a queue located in the memory, wait until coupled to a charging device and then execute said tasks.

In a further aspect of the invention, a mobile wireless communications terminal capable of wireless speech and data communication over an air interface, said terminal including processing means for processing tasks and timing means for performing timed execution of said tasks, memory means for storing instructions and data associated with each such task, data transmission means for data connection between said terminal and said charging device, is characterized in that said terminal is arranged to transfer at least part of the data to be processed in said instructions to said charging device for storage, and arranged to retrieve said stored data during said task execution.

In a further aspect of the invention, a mobile wireless communications terminal capable of wireless speech and data communication over an air interface, said terminal including processing means for processing tasks and timing means for performing timed execution of said tasks, memory means for storing instructions and data associated with each such task, is characterized in that said processing means of said terminal are arranged to study under a period of time the battery charging routines of the user, calculate the time intervals with a high likelihood that said terminal is being connected to the charger and execute the instructions stored in the memory to perform one or more delayable tasks upon entering one of said calculated time intervals.

In a further aspect of the invention, a mobile wireless communications terminal capable of wireless speech and data communication over an air interface, said terminal including processing means for processing tasks and timing means for performing timed execution of said tasks, memory means for storing instructions and data associated with each such task, is characterized in that said terminal is arranged to study under a period of time the battery charging routines of the user, calculate time intervals with a high likelihood the mobile terminal being connected to the charger, receive in the mobile terminal instructions to perform one or more tasks that can be executed with a delay, store the instructions in a queue located in the memory, check in said terminal whether it is coupled to a charging device, execute said tasks if that is the case or defer the execution of said tasks in said time interval, if the mobile terminal is not coupled to a charging device, until one of the following conditions applies, whichever occurs first:
  the mobile terminal is connected to a charging device;
  the maximum time limit for postponing the execution of said tasks is approaching;
  the level of battery power available is approaching a limit putting execution of at least part of said postponed tasks at risk.

In a further aspect of the invention, a charging device capable of charging the battery of a mobile wireless communications terminal, said charging device including data transmission means for a two-way data connection between said charging device and a mobile wireless communications terminal, said charging device including memory means for storing data, is characterized in that said charging device is arranged to store at least part of the data to be processed in the instructions associated with tasks to be executed by said terminal, and arranged to return said stored data to said mobile terminal when requested by said terminal.

In a further aspect of the invention, a charging device capable of charging the battery of a mobile wireless communications terminal, said charging device including data transmission means for a two-way data connection between said charging device and a mobile wireless communications terminal, said charging device including memory means for storing data, is characterized in that said charging device comprises processing means for the task execution sharing between said terminal and said charging device.

In a further aspect of the invention, a process for delayed execution of tasks in a mobile wireless communications terminal capable of wireless speech and data communication over an air interface, said terminal including processing means for processing tasks and timing means for performing timed execution of said tasks, said terminal including memory means for storing instructions and data associated with each such task, is characterized in that said process comprises the steps wherein
  said mobile terminal receives at least one instruction to perform a task,
  said terminal identifies the task as a delayable background task,
  said terminal stores the data related to the execution of delayable task in a queue located in the memory,
  said terminal executes said task using the processing means of said terminal upon recognizing a connection between the battery of said terminal and the power source of a charging device.

In a further aspect of the invention, a process for delayed execution of tasks in a mobile wireless communications terminal capable of wireless speech and data communication over an air interface, said terminal including processing means for processing tasks and timing means for performing timed execution of said tasks, said terminal including memory means for storing instructions and data associated with each such task, is characterized in that said process comprises the steps wherein
  said mobile terminal receives at least one instruction to perform a task,
  said terminal identifies the task as a delayable background task,
  said terminal stores the data related to the execution of delayable task in a queue located in the memory,
  said terminal executes said task using the processing unit upon entering the precalculated time interval based on studying the battery charging routines of the user during which said terminal is being connected to a charging device.

Examples of delayable background operations could be:
  downloading and prefetching (precaching) of content such as Internet pages, music, games, photographs
  calculation of user profiles and preferences related to personalization and recommendation applications
  periodical virus scanning
  compression of files to save memory or disk space/flash memory
  organization of stored files to prevent fragmentation of files which in turn saves power and speeds up the terminal.

In executing as many battery power consuming operations as possible when the terminal is being connected to a battery charger, the standby time of the battery and the working time for other functions, like talking, displaying and playback, can in practice be significantly increased.

In one embodiment of the invention the terminal could be set up to learn the habits of the user and utilize the learned information to automatically schedule the execution of power consuming background activities. The terminal may or may not to have to communicate with the mobile network or services. The desired tasks may be executed whether or not the terminal is connected to the charger, but under otherwise favourable conditions, e.g. during the night, when bandwidth is available at lower rates and the terminal has learnt that the user usually leaves the terminal with the battery fully charged for the night.

In another embodiment of the invention, the performance of background operations is shared with an "intelligent" charging unit. In this case the charging unit would make it possible to reduce the processing power, memory and communication capacity requirements of the mobile terminal.

BRIEF DESCRIPTION OF THE DRAWINGS

In the following, the invention is described in more detail by reference to the attached drawings, wherein.

BEST MODE FOR CARRYING OUT THE INVENTION

Figure 1:
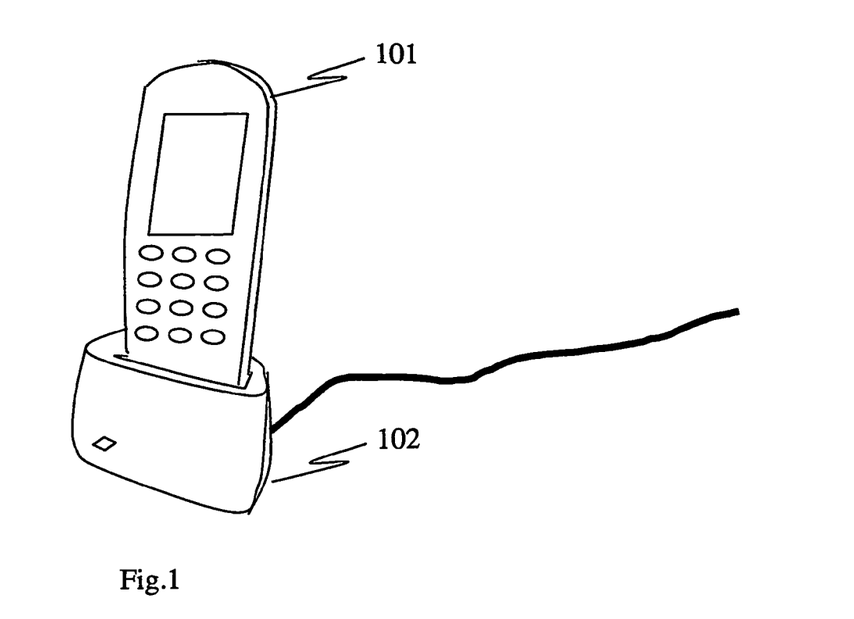
FIG. 1 shows a mobile terminal (101) inserted in a battery charger (102)
Figure 2:
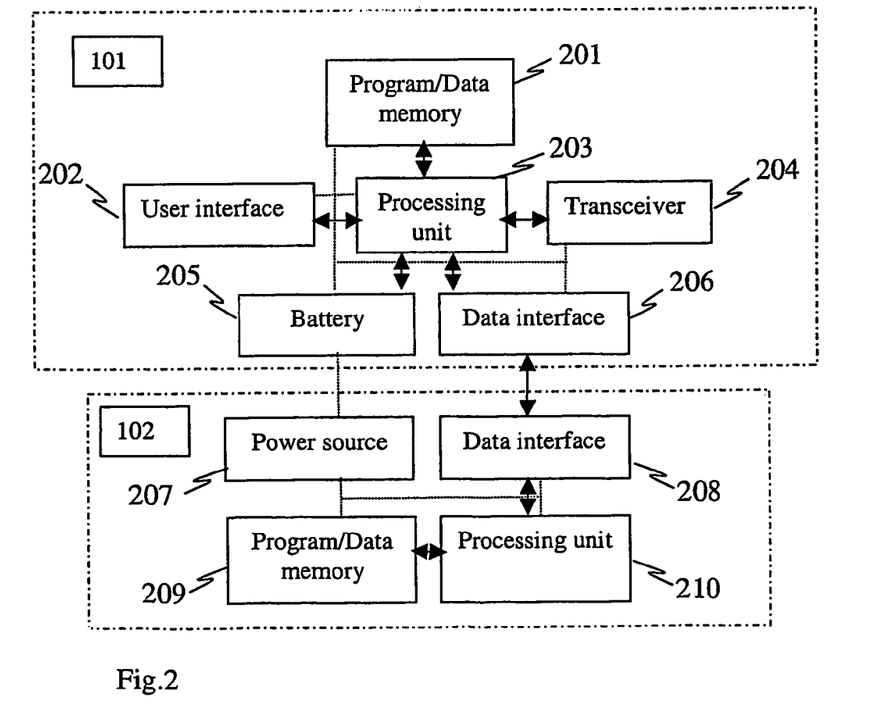
FIG. 2 is a block diagram of the terminal (101) and the battery charger (102)

Referring to FIGS. 1 and 2, the basic elements involved in the inventive concept are a mobile terminal (101) including components like a transceiver (204), a processing unit with timer capabilities (203), a program/data memory (201) and an user interface (202), and a charging device (102) adapted to receive the terminal, make connection to battery connectors thereof and thus being able to recharge the battery (205) or batteries of said terminal (101). In addition to mandatory power source (207), an "intelligent" charger could include a memory (209) or even a processing unit (210) to temporarily store or process the information transmitted from the terminal (101) using a two-way data connection (206,208) between the terminal (101) and the charger (102). Usually, the charger (102) is connected to a domestic or car power outlet (not shown).

In this first embodiment of the invention, the charging device (102) does not differ from the devices already on the market; the only function it has is to recharge the batteries of the mobile terminal (101). The features of this embodiment will be explained in more detail below, including embodiments incorporating learning and utilizing the charging behavior of the user.

The mobile terminal (101) is equipped, among other things, with music playback functionality, and the user has ordered a music data file to be delivered to the mobile terminal (101) via the Internet. The music file format can, for example, be the popular MP3 format, or any other format the mobile terminal is capable of handling. The amount of power required for receiving an MP3 music file is quite high. As approximately 1 MB of data is required for each minute of music, the user of the mobile terminal (101) is, according to the present invention, inclined to download the music while the terminal (101) is being connected to a battery charger (102), in order to optimize the processing of power consuming background operations. Also, as the user has no time or desire to listen to this particular piece of music immediately, he has ordered the file to be delievered to the mobile terminal (101), say within the next 24 hours. This deferred downloading is referred to as background downloading.

Figure 3:
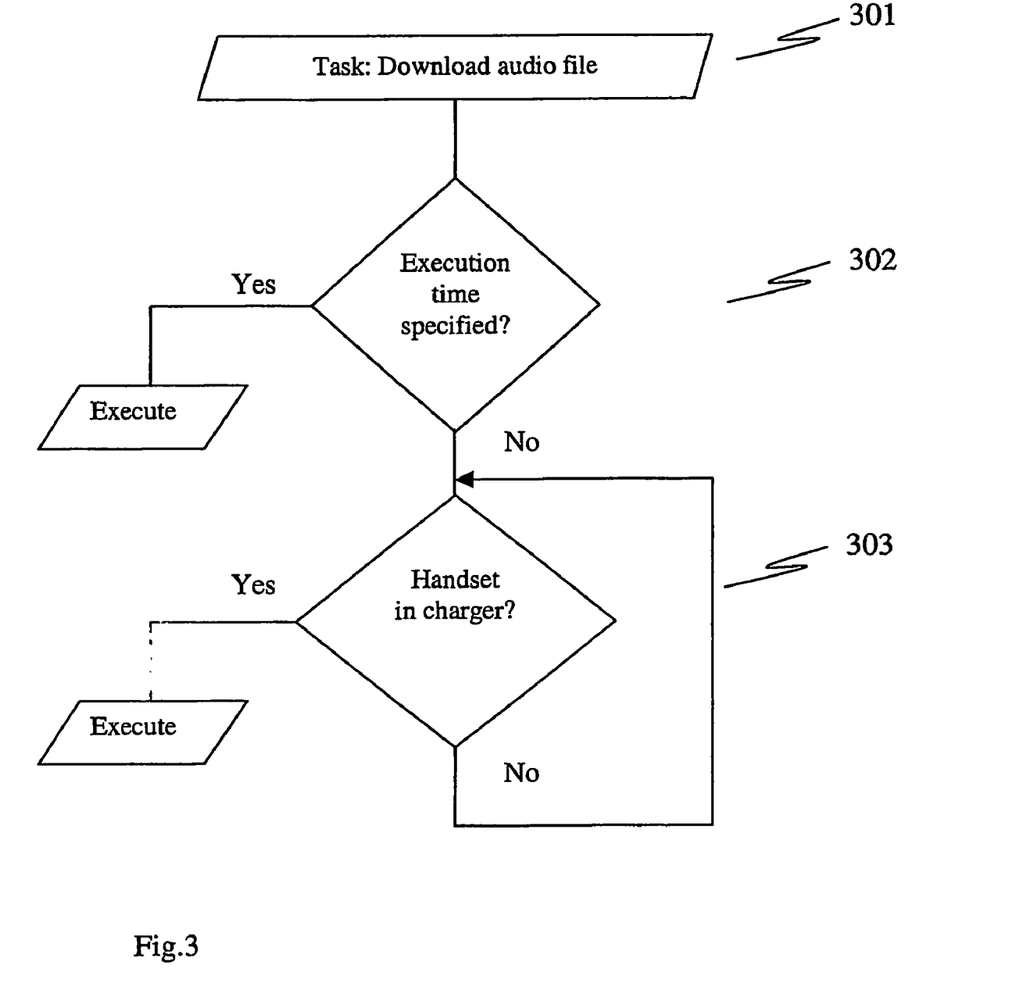
FIG. 3 is a chart disclosing a first embodiment of the invention.

According to the flowchart of FIG. 3, the inventive process is initiated by the user who issues an audio file download order (301). The mobile terminal (101) checks whether immediate or background downloading is requested by the user (302). Let us assume that the user has a default maximum time for the background download of 24 hours. In this case no specific time is given, and the terminal (101) identifies the command as a default background download command, and assumes normal operation while pushing the download task in its command stack or similar queue of tasks located in the memory (201) to be performed later on (303) by the processing unit (203), when the terminal (101) is connected to a battery charger (102). Additionally, if the user tends to abort the charging phase before completion due to his irregular lifestyle etc., it may be advantageous to defer the task execution until the battery (102) is fully charged. Anyway, the operations can be taken from the queue by following e.g. first-in-first-out (FIFO) principle, or by a predetermined priority. Stacking commands and operands are within the normal skills of any system programmer, so this function as such need not be explained in more detail.

Figure 4:
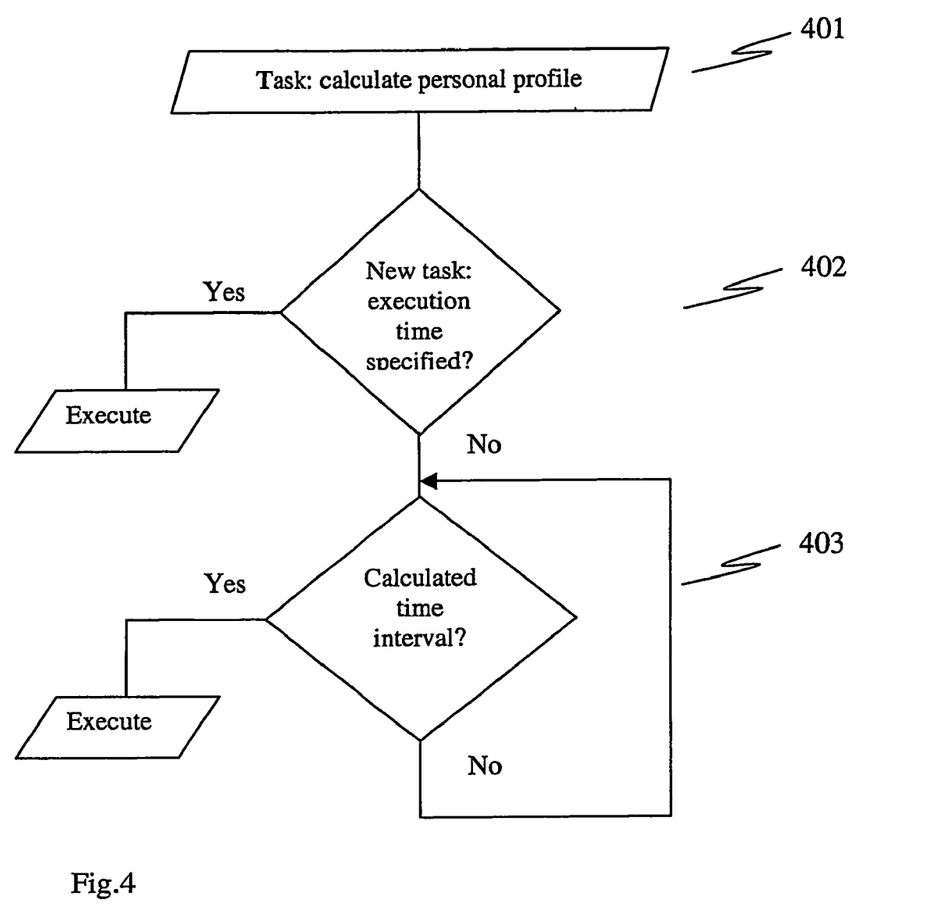
FIG. 4 is a chart disclosing a second embodiment of the invention.

According to the flowchart of FIG. 4, in the second embodiment of the present invention, the mobile terminal (101) has analyzed the battery charging routines of the user and calculated favorable time intervals to execute background tasks (401). During those intervals the terminal (101) is most probably being connected to a charger (102). After receiving instructions to perform a task without specified execution time (402), the terminal (101) defers the task execution until the calculated time interval is entered (403). Typically, tasks like this involve downloading and prefetching (precaching) of content such as Internet pages, music, games, photographs, and the mobile terminal (101) requests the service (or a separate content delivery system) to send e.g. an MP3 music file between 1-6 a.m., since during this time said terminal (101) is usually connected to a charger (102) and the battery (205) is full. When the user wants to have the music file ready in the morning, the downloading is performed before the specified time limit. Other types of tasks involving merely internal calculation (see below) may in these cases be less prioritized, and execution of them is postponed until all tasks requiring data transfer have been executed.

In such an embodiment, based on user behavior monitoring and if any additional decision rules are not considered, the delayable task may be performed during the calculated time interval whether the mobile terminal (101) is connected to the charging device (102) or not, thus running the risk of consuming extra battery power every now and then. However, as the device learns the behavior of the user, and the user learns to know the details of this feature, the occurrence of these cases where downloading or background processing is made without power backup from the charger may in practice be rare, without any consequences in power failures.

Figure 5:
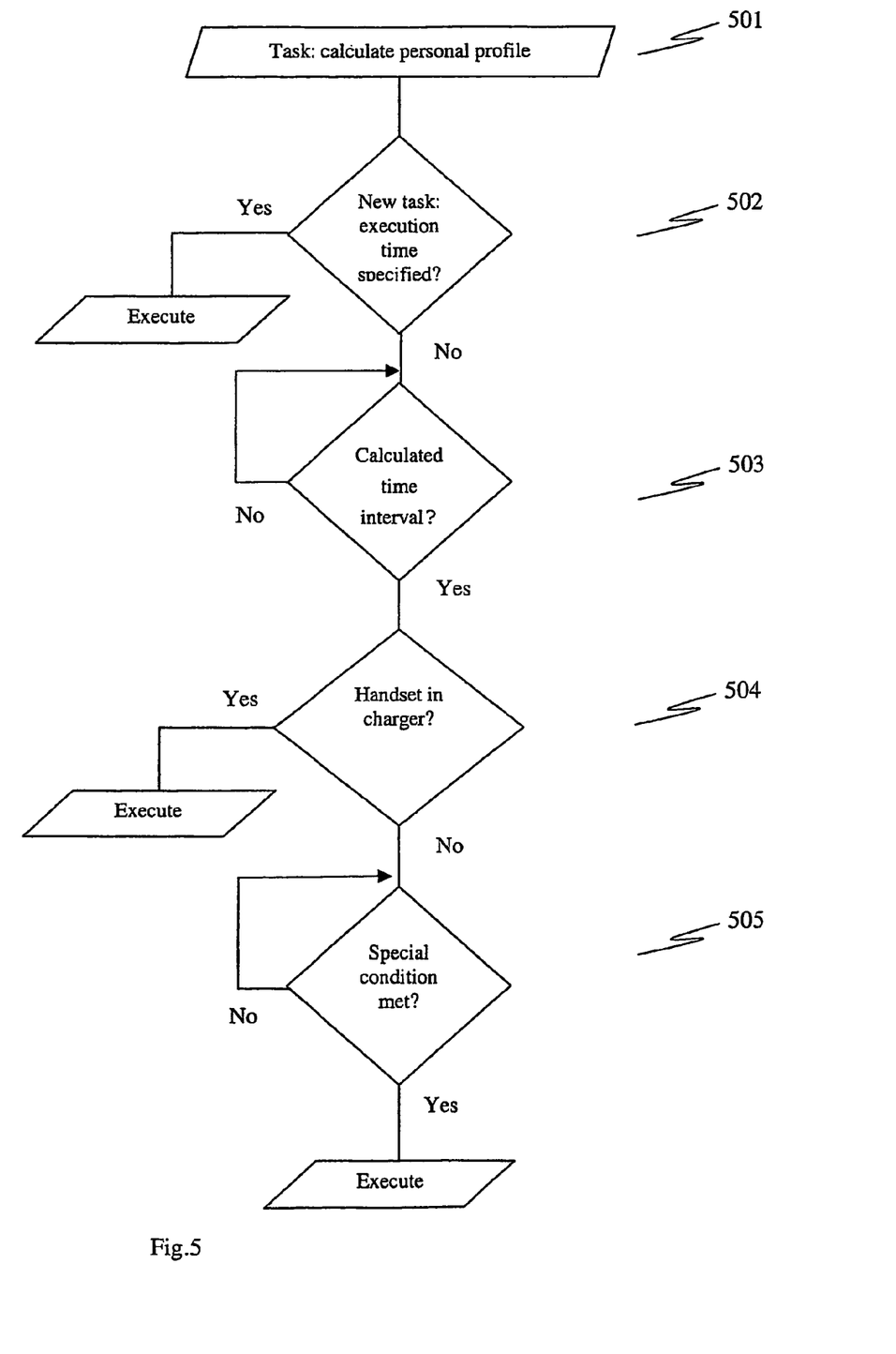
FIG. 5 is a chart disclosing a third embodiment of the invention.

In the third embodiment of the present invention, see the flowchart of FIG. 5, the terminal (101) also exploits the calculated time intervals (501) for determining the proper execution time of delayable tasks (502). In addition, the terminal (101) may decide to wait during said calculated time interval (503) until said terminal actually is connected (504) to a charging device (102), and extending this waiting time until the end of the time delay available, or until the level of battery power available is approaching a limit putting the full execution of the queued tasks at risk There may be more options how to handle those situations, of course, some of which may be user-determined, e.g. by issuing a task priority list (505). For example, if the terminal (101) is coupled to a charger (102) in late evening, a fair assumption would be that it will stay there for the rest of the night. In a simple implementation, the terminal (101) sends the request for delivery immediately, or when the battery (205) is fully charged. In another implementation, the terminal (101) may wait till the expected traffic conditions and data transfer costs are optimal, e.g. until midnight. To be able to optimize the utilization of favorable traffic conditions and data transfer costs, the terminal (101) may have to communicate with the service provider and network carrier. By using slower connection speeds or channels than would be possible at instant downloading and listening, in a period of quiet traffic, normal daytime services can be achieved at significantly lower costs. There are tasks requiring lots of calculation but little or no data transfer over the air interface. Such tasks are, for example, calculation of user profiles and preferences related to compression of files to save memory or disk space/flash memory; and organization of stored files to prevent fragmentation of files which in turn saves power and speeds up the terminal. In such cases, the benefits are mostly due to the power saving aspect of the invention, requiring the terminal (101) actually being coupled to the charger (102).

An example of a learning rule that could initiate a more intelligent timing of the queued tasks would be, for example: IF the user with 95% probability fully charges the terminal's battery every night, AND there is on the average minimum six hours of charging & battery full time, THEN trigger the intelligent cost-saving mode.

In another aspect of the invention, the charging device (102) is equipped with circuitry making it possible for it to share processing tasks with the mobile terminal (101), or to completely execute certain tasks on behalf of the mobile terminal (101) while said terminal is inserted in the charging unit (102).

Further embodiments of the invention include sharing task execution between the mobile terminal (101) and the charging device (102). In such cases the charger (102) includes functionalities on top of merely battery charging, and should most probably be custom built for the mobile terminal. In one embodiment of the invention, the charging device (102) is provided with an additional memory capacity (209), making it possible to background download more data than would fit into the mobile terminal (101) itself. Data can then be swapped or copied between the mobile terminal (101) and the charging device (102) in a similar fashion as it is done e.g. between the device memory and the SIM (Secure Identity Module) card module in today's GSM (Global System for Mobile Communications) cellular phones.

In another embodiment, the charging device (102) is provided with processing power of its own (210), making it possible for it to perform tasks where the mobile terminal (101) only needs to collect the raw data, send it to the charging device (102) and receive the end results of the executed tasks. Performing memory- and energy consuming, not time critical tasks inside the mobile terminal (101) gives no added value to the user in the cases of e.g. calculating of user profiles and preferences related to personalization and recommendation applications, periodical virus scanning, compression of files to save memory or disk space/flash memory, and organization of stored files to prevent fragmentation of files which in turn saves power and speeds up the terminal.

Some of the background tasks may be only user-initiated, but many of them may be part of pre-programmed service and maintenance routines, being thus self-initiated and scheduled by the system. Of course a manual and overruling initiation of any background task by the user should be possible, e.g. an instant virus scanning.

Implementations of some of aforesaid embodiments require a data connection (206,208) between the mobile terminal (101) and the charging device (102), and an appropriate protocol and software to control the process. Today's mobile terminals are, however, increasingly well equipped with standardized platforms to handle data exchange with other devices, such as personal computers, sensors, pointing devices etc. Such platforms include wireless infrared- and LPRF (e.g. Bluetooth) based Personal Area Network (PAN) solutions, and wired connections to computers, FM radios, external keyboards and the like. It is thus for one skilled in the art not difficult to implement a suitable data transfer solution between a charging device (102) and a mobile terminal (101), as most new mobile terminal models already have a suitable capability built-in.

According to the invention, having an intelligent charging device provided with a processor and memory of its own, can in most cases of normal usage considerably relieve the processing tasks of e.g. forthcoming third generation mobile terminals. This makes it possible apart from saving battery power and cost to reduce memory and processing power requirements of the mobile terminals, making them even more less energy consuming, thus prolonging standby and active usage times. The mobile terminal can also be made lighter and smaller, the obvious other side of the coin would be to direct the available extra power saved to top-notch video and multi-media applications.

The invention claimed is:

1. A method, comprising:
   receiving in a mobile wireless communication terminal one or more instructions to respectively perform one or more tasks concerning data file transfer over an air interface that can be executed in said terminal with a delay,
   storing said instructions in said terminal,
   checking in said terminal whether said terminal is coupled to a charging device, and
   executing in said terminal said data file transfer tasks over said air interface upon recognizing an electrical connection between said terminal and said charging device.

2. A method according to claim 1, wherein said receiving instructions includes receiving instructions from the user via the user interface of said terminal.

3. A method according to claim 1, wherein said receiving instructions includes receiving instructions generated internally in said mobile terminal triggered by a maintenance or update process.

4. A method according to claim 1, wherein the method further includes transferring at least part of data to be processed in said instructions from said terminal to said charging device for storage, and retrieving said data during said executing said data file transfer tasks over said air interface.

5. A method according to claim 1, wherein the method further includes transferring at least part of data to be processed in said instructions from said terminal to said charging device for storage and processing, and retrieving processed data from said charging device to said terminal during said executing said data file transfer tasks over said air interface.

6. A method, comprising:
   studying, in a mobile wireless communications terminal, under a period of time terminal battery charging routines of a user of said terminal,
   calculating in said terminal time intervals with a high likelihood that said mobile terminal is connected to the charger,
   receiving in the mobile terminal instructions to perform one or more data file transfer tasks over an air interface that can be executed with a delay, storing the instructions in said terminal, executing in said terminal said data file transfer tasks over said air interface upon entering one of said calculated time intervals.

7. A method according to claim 6, wherein the receiving instructions includes receiving instructions from the user via a user interface of said terminal.

8. A method according to claim 6, wherein the receiving instructions includes receiving instructions generated internally in said terminal triggered by a maintenance or update process.

9. A method according to claim 6, wherein said executing said data file transfer tasks over said air interface in said time interval is made using a connection speed, or a communications channel, or both, providing at least a minimum accepted Quality of Service at the lowest possible cost.

10. A method according to claim 6, wherein said executing said data file transfer tasks over said air interface in said time intervals additionally involves checking if the terminal is coupled to a battery charging device, and concluding according to a predetermined set of rules whether to start executing any data file transfer tasks over said air interface or not.

11. A method, comprising:

studying, in a mobile wireless communication terminal, under a period of time terminal battery charging routines of a user of said terminal, calculating, in said terminal, a time interval with a high likelihood said terminal being connected to a charger, receiving in the terminal instructions to perform one or more data file transfer tasks over an air interface that can be executed in the terminal with a delay, storing the instructions in the terminal to be executed during said time interval, checking in the terminal whether said mobile terminal is coupled to said charger upon entering said time interval, and executing said data file transfer tasks over said air interface if that is the case;

deferring execution of said data file transfer tasks over said air interface in said time interval, if the terminal is not coupled to said charger, until one of the following conditions applies, whichever occurs first:

the terminal is connected to said charger;

a maximum time limit for postponing the execution of said data file transfer tasks over said air interface is approaching;

a level of battery power available is approaching a limit putting execution of at least part of said postponed data file transfer tasks over said air interface at risk.

12. A mobile wireless communications terminal capable of wireless speech and data communication over an air interface, said terminal comprising:

a processing unit for processing data file transfer tasks over an air interface and a timing device for performing timed execution of said data file transfer tasks over said air interface in said terminal, a memory for storing instructions and data associated with each such data file transfer task over said air interface in said terminal, wherein said terminal is configured to store received instructions for delayable data file transfer tasks over said air interface located in the memory, wait until coupled to a charging device and then execute said data file transfer tasks in said terminal over said air interface.

13. A mobile wireless communications terminal according to claim 12, wherein at least part of the stored instructions for delayable data file transfer tasks over said air interface are originally received from the user via a user interface of said terminal.

14. A mobile wireless communications terminal according to claim 12, wherein at least part of the stored instructions for delayable data file transfer tasks over said air interface are generated by an internal maintenance or update process of said terminal.

15. A mobile wireless communications terminal capable of wireless speech and data communication over an air interface, said terminal comprising:

a processing unit for processing data file transfer tasks over an air interface with timed execution;

a memory for storing instructions and data associated with each such data file transfer task over said air interface; and an interface for data connection between said terminal and a charging device, wherein said terminal is configured to transfer at least part of the data to be processed in said instructions from said terminal to said charging device for storage therein, and configured to retrieve said stored data during execution of said data file transfer task over said air interface.

16. A mobile wireless communication terminal according to claim 15, configured to transfer at least part of the data to be processed in said instructions from said terminal to said charging device for processing, and configured to retrieve processed data from said charging device during said timed execution of said data file transfer tasks over said air interface.

17. A mobile wireless communications terminal capable of wireless speech and data communication over an air interface, said terminal comprising:

a processing unit for processing data file transfer tasks over an air interface with timed execution; and a memory for storing instructions and data associated with each such data file transfer task over said air interface, wherein said processing unit of said terminal is configured to study under a period of time terminal battery charging routines of a user of the terminal, to calculate time intervals with a high likelihood that said terminal is connected to a battery charger and to execute the instructions stored in the memory to perform one or more delayable data file transfer tasks over said air interface upon entering at least one time interval of said calculated time intervals.

18. A mobile wireless communications terminal according to claim 17, wherein said processing unit is configured to execute said data file transfer tasks over said air interface in said at least one time interval using a connection speed, or communications channel, or both, providing at least a minimum accepted Quality of Service at a lowest possible cost.

19. A mobile wireless communications terminal according to claim 17, wherein said processing unit is configured to check during execution of the instructions if said mobile terminal is coupled to a battery charging device, and to conclude according to a predetermined set of rules whether to start executing any data file transfer task over said air interface or not.

20. A mobile wireless communications terminal according to claim 18, configured to communicate with a service provider, or network carrier, or both, for enabling utilization of favorable traffic conditions and transfer costs.

21. A mobile wireless communications terminal capable of wireless speech and data communication over an air interface, said terminal comprising:

a processing unit for processing data file transfer tasks over an air interface with timed execution;

a memory for storing instructions and data associated with each such data file transfer task over said air interface, wherein said terminal is configured to study under a period of time terminal battery charging routines of a user, to calculate time intervals with a high likelihood the terminal is connected to a charger, to receive in the terminal instructions to perform one or more of said data file transfer tasks over said air interface that can be executed with a delay, to store the instructions in the memory, to check in said terminal whether it is coupled to said charger, to execute said data file transfer tasks over said air interface if that is the case or to defer execution of said data file transfer tasks over said air interface, if the terminal is not coupled to said charger, until one of the following conditions applies, whichever occurs first:

the terminal is connected to said charger;

a maximum time limit for postponing execution of said data file transfer tasks over said air interface is approaching;

a level of battery power available is approaching a limit putting execution of postponed data file transfer tasks over said air interface at risk.

22. A mobile wireless communications terminal according to claim 12, wherein said terminal is substantially a third generation terminal.

23. A charging device capable of charging a battery of a mobile wireless communications terminal, said charging device comprising:

a data interface for a two-way data connection between said charging device and said terminal when connected for said charging; and a memory for storing data, wherein said charging device is configured to store at least part of data to be processed according to instructions associated with one or more data file transfer tasks over said air interface by said terminal for execution at least in part in said terminal with execution of said data file transfer tasks over said air interface postponed until connected to said charging device, and configured to return said stored data to said terminal when requested by said terminal, wherein said postponed data file transfer tasks over said air interface are terminal background tasks.

24. A charging device capable of charging a battery of a mobile wireless communications terminal, said charging device including a data interface for a two-way data connection between said charging device and said mobile wireless communications terminal, said charging device including a memory for storing data, wherein said charging device comprises a processing unit for sharing task execution between said terminal and said charging device wherein sharing task execution comprises sharing execution of postponed terminal data file transfer background tasks carried out over said air interface by said terminal.

25. A charging device according to claim 24, further comprising a processing unit for task execution on behalf of said terminal.

26. A method, comprising:

receiving in a mobile wireless communications terminal at least one instruction to perform a data file transfer task over an air interface, identifying in said terminal whether the data file transfer task over said air interface is a delayable data file transfer task over said air interface and, if so, storing data related to execution of said delayable task in a queue located in a memory of said terminal, said terminal executing said data file transfer task over said air interface using a processing unit of said terminal upon recognizing a connection between said terminal and a power source for charging a battery of said terminal.

27. A process according to claim 26, wherein said at least one instruction to perform a data file transfer task over said air interface is received from a user via a user interface of said terminal.

28. A process according to claim 26, wherein said at least one instruction to perform a data file transfer task over said air interface is generated internally in said mobile terminal, triggered by a maintenance or update process stored in the memory of the terminal and executed by a processing unit of the terminal.

29. A process according to claim 26, wherein information for said identifying whether the data file transfer task over said air interface is a delayable data file transfer task over said air interface is included in said at least one instruction to perform a data file transfer task over said air interface.

30. A process according to claim 26, wherein information for said identifying whether a data file transfer task over said air interface is a delayable data file transfer task over said air interface is found from a predetermined list of task urgencies stored in the memory of said terminal.

31. A method, comprising:

receiving in a mobile terminal at least one instruction to perform a data file transfer task over an air interface, identifying in said terminal if the data file transfer task over said air interface is a delayable background data file transfer task over said air interface and, if so, storing in said terminal data related to execution of said delayable data file transfer task over said air interface in the memory, executing said delayable data file transfer task in said terminal using a processing unit in said terminal upon entering a precalculated time interval based on studying terminal battery charging routines of a user of the terminal during which said terminal is connected to a charging device.

32. A method according to claim 31, further comprising:

checking in said terminal during said precalculated time interval and prior to said executing said delayable data file transfer task over said air interface if said terminal is coupled to said charging device, and deciding according to a predetermined set of rules whether to start executing said data file transfer tasks over said air interface or not.

* * * * *